United States Patent [19]
Beer et al.

[11] Patent Number: 5,864,676
[45] Date of Patent: Jan. 26, 1999

[54] URL LOGIN

[75] Inventors: John C. Beer, Oceanside; Timothy T. Kraft, Del Mar; Steven K. Beal, Encinitas; Steven C. Wilson, Carlsbad, all of Calif.

[73] Assignee: TriTeal Corporation, Carlsbad, Calif.

[21] Appl. No.: 748,664

[22] Filed: Nov. 14, 1996

[51] Int. Cl.⁶ .................................................. G06F 17/40
[52] U.S. Cl. .................. 395/200.59; 395/200.47
[58] Field of Search ................ 395/200.48, 200.55, 395/200.59, 187.01, 188.01, 200.47

[56] References Cited

U.S. PATENT DOCUMENTS

| | | | |
|---|---|---|---|
| 5,564,018 | 10/1996 | Flores et al. | 395/200.36 |
| 5,655,077 | 8/1997 | Jones et al. | 395/187.01 |
| 5,675,507 | 10/1997 | Bobo, II | 348/17 |
| 5,684,951 | 11/1997 | Goldman et al. | 395/188.01 |

OTHER PUBLICATIONS

Gundavaram, S. CGI Programming on the World Wide Wed, Copyright 1996 O'Reilly & Associates. Mar. 1996.

*Primary Examiner*—Mehmet B. Geckil
*Attorney, Agent, or Firm*—Fish & Richardson P.C.

[57] ABSTRACT

A universal resource locator ("URL") login system. The invention makes full use of the internet/intranet concept by using a URL instead of a specific home directory as a fixed location to control and access a login function. The URL login function causes objects to be collected from various locations on a network and brought to a local client computer system where they are rendered. The content of one URL may reference another URL, so that a compound object is created comprising a collection of objects drawn from various storage locations on a network. The invention permits a user to access the user's private information and personal desktop no matter where the user is located. Accordingly, a user can use public computer systems to fully access private networks. Upon a successful login, the invention fetches objects from remote locations and instantiates them locally for the duration of the user's session. The user need only tell, via a URL, a local client computer system where the objects are located, and if required, the login system of the invention will return a challenge for access. The challenge is for access to the desired object, and not access to a particular computer system.

12 Claims, 2 Drawing Sheets

URL LOGIN

BACKGROUND OF THE INVENTION

1. Field of the Invention

This invention relates to network systems, and more particularly to a method and protocol for logging into a network system.

2. Description of Related Art

Modem network systems generally require a "login" operation by a user before allowing a user access to restricted computer system resources. Once logged in, a user has access to various system resources, determined by the user's "privileges", set by a network administrator. Such privileges generally include access to private programs and files set up for the user.

Typically, a user will invoke a dialogue on a client computer system that interacts with a login manager program operating on a server computer system. Such login systems use the concept of a "home directory". A user's home directory is a fixed location on a file system which becomes the user's current working directory at the time of login. The home directory can be unique for each machine on which the user has a valid user name and password, or the same home directory can be made to serve on multiple hosts via a distributed file system scheme, such as NFS (network file system). A network administrator must configure the home directory for each user.

This architecture severely limits the ability of a user to log into a particular network system. For example, a user may wish to log into a network via a public computer terminal, such as one installed in a kiosk in a public place (e.g., an airport terminal or shopping mall). In such a situation, there is no possible way to maintain a login account for every possible person who might use the public computer, and "guest" accounts have little or no real value, since they do not let a user access all of the resources to which that user has privileges.

Accordingly, it would be useful if users could login to a network system without requiring predefinition of a home directory by a network administrator for each user. The present invention provides a method and system for accomplishing this goal.

SUMMARY OF THE INVENTION

The invention provides a universal resource locator ("URL") login system. A URL is a pointer or address to an object in a network system. The invention makes full use of the internet/intranet concept by using a URL instead of a specific home directory as a fixed location to control and access a login function. The URL login function causes objects to be collected from various locations on a network and brought to a local client computer system where they are rendered. The content of one URL may reference another URL, so that a compound object is created comprising a collection of objects drawn from various storage locations on a network.

With the inventive URL login system, there is no longer a need for the user to specify a host to login to, and no need for an administrator to configure a home directory for the user. This facilitates the use of network computers (NCs), which are independent computing devices that require only a network to use as a source for objects. A network computer fetches a resource and instantiates it locally so that no outside resources are needed. Examples of resources are JAVA, applets, *.html files, images, etc. By taking the task of collecting network objects out of a single client application, such as a browser, and making it a feature of the desktop (i.e., the environment controlling the operation of a network computer), any type of object may be collected and/or inspected, and these objects can be made to interact with one another through such operations as "drag and drop".

Using the invention, a secure personal spot on a storage device (e.g., a disk drive) is only needed as a place to store collections of object references (i.e., URL's) which define a compound object, such as a desktop, or to store objects whose state have been changed by the user. Even in the case of saving objects, no local storage device or home directory is required, because the object can be posted to another computer system or storage device "farm" with a protocol such as "http" or "ftp". A user can fetch an object, change its state, and put the object back where it was found, all with the same protocol.

The invention permits a user to access the user's private information and personal desktop no matter where the user is located. Accordingly, a user can use public computer systems to fully access private networks. Upon a successful login, the invention fetches objects from remote locations and instantiates them locally for the duration of the user's session. The user need only tell (via a URL) a local client computer system where the objects are located, and if required, the login system of the invention will return a challenge for access. The challenge is for access to the desired object, and not access to a particular computer system.

To make this process easier for the user, in the preferred embodiment, a login manager accepts a "nickname" for the desired login location. For example, the "nickname" may be an email address, which is easier to remember than a URL. The login manager translates the nickname into a URL, and the resulting URL is used for the login process. The URL which equates to the nickname will, in most cases, be a reference to a document which describes a desktop. The desktop is rendered, and presents to the user the user's own desktop objects (e.g., file icons, application icons, etc.)

The details of the preferred embodiment of the invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
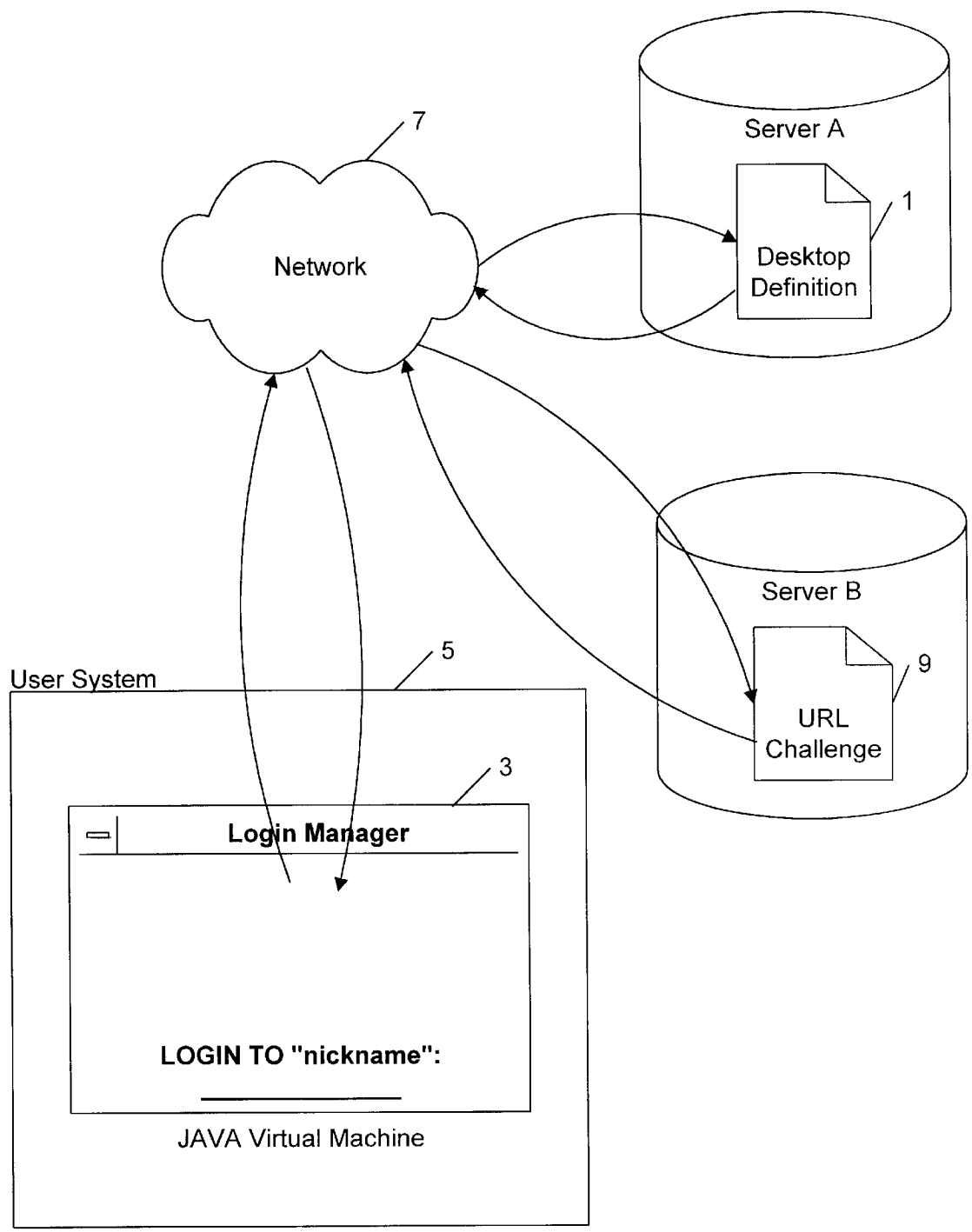
FIG. 1 is block diagram of object relationships in accordance with the invention.

Throughout this description, the preferred embodiment and examples shown should be considered as exemplars, rather than as limitations on the invention.

This invention is related to the inventions entitled "System And Method For Distributing Objects And User Interfaces" (U.S. patent application Ser. No. 08/747,793) and "Method for Displaying Multiple Visual Styles" (U.S. patent application Ser. No. 08/747,793), now U.S. Pat. No. 5,793,368 filed on the same date as the present patent application.

Overview

In order to prevent unauthorized access to the content of URLs, the various existing network transport protocols (e.g, http, ftp, etc.) have mechanisms for "challenging" access to such content. Challenges range from simple "username" and "password" input pairs passed un-encrypted over the network, to highly sophisticated symmetric key algorithms. Each object referenced by a URL may be associated with any one of the challenges supported by the protocol being used to transport that object. to allow for the wide array of possible protocols and challenge types, the invention provides a Login Manager that issues no challenges of its own, but instead adopts any existing challenge of an object referenced by a URL. More particularly, during a login attempt via a URL, the Login Manager determines if the object referenced by the URL has a challenge. If so, the Login Manager fetches an associated challenge object and "plugs" that challenge object into the Login Manager's own user interface. After a user has answered the challenge, the Login Manager makes another attempt to access the target object referenced by the URL, this time using the completed challenge object as an argument. If the challenge is successful, the Login Manager fetches the contents of the referenced URL and instantiates the referenced objects locally for the duration of the user's session.

The invention thus permits a user to access the user's private information and personal desktop no matter where the user is located. Accordingly, a user can use public computer systems to fully access private networks. The user need only tell (via a URL) a local client computer system where the objects are located, and if required, the Login Manager returns a challenge for access. Note that the challenge is for access to the desired object, and not access to a particular computer system.

To make this process easier for the user, in the preferred embodiment, the Login Manager employs a "nickname" for the desired login location. For example, the nickname may be an email address, which is easier to remember than a URL. While a URL must be a unique relative to the entire Internet, a nickname need only be unique relative to an intranet domain. The Login Manager translates the nickname into a URL, and the resulting URL is used for the login process. The URL which equates to the nickname will, in most cases, be a reference to a document which describes a desktop. The desktop is rendered, and presents to the user the user's own desktop objects (e.g., file icons, application icons, etc.)

In the preferred embodiment, the invention is implemented in the JAVA programming language. With the introduction of JAVA, it is possible to bring small applications called "applets" from a server to a client and execute such applications locally. Because JAVA compiles to intermediate host machine independent code, the compiled JAVA applets can run on any host that has a JAVA Virtual Machine (JVM).

EXAMPLE

Figure 2:
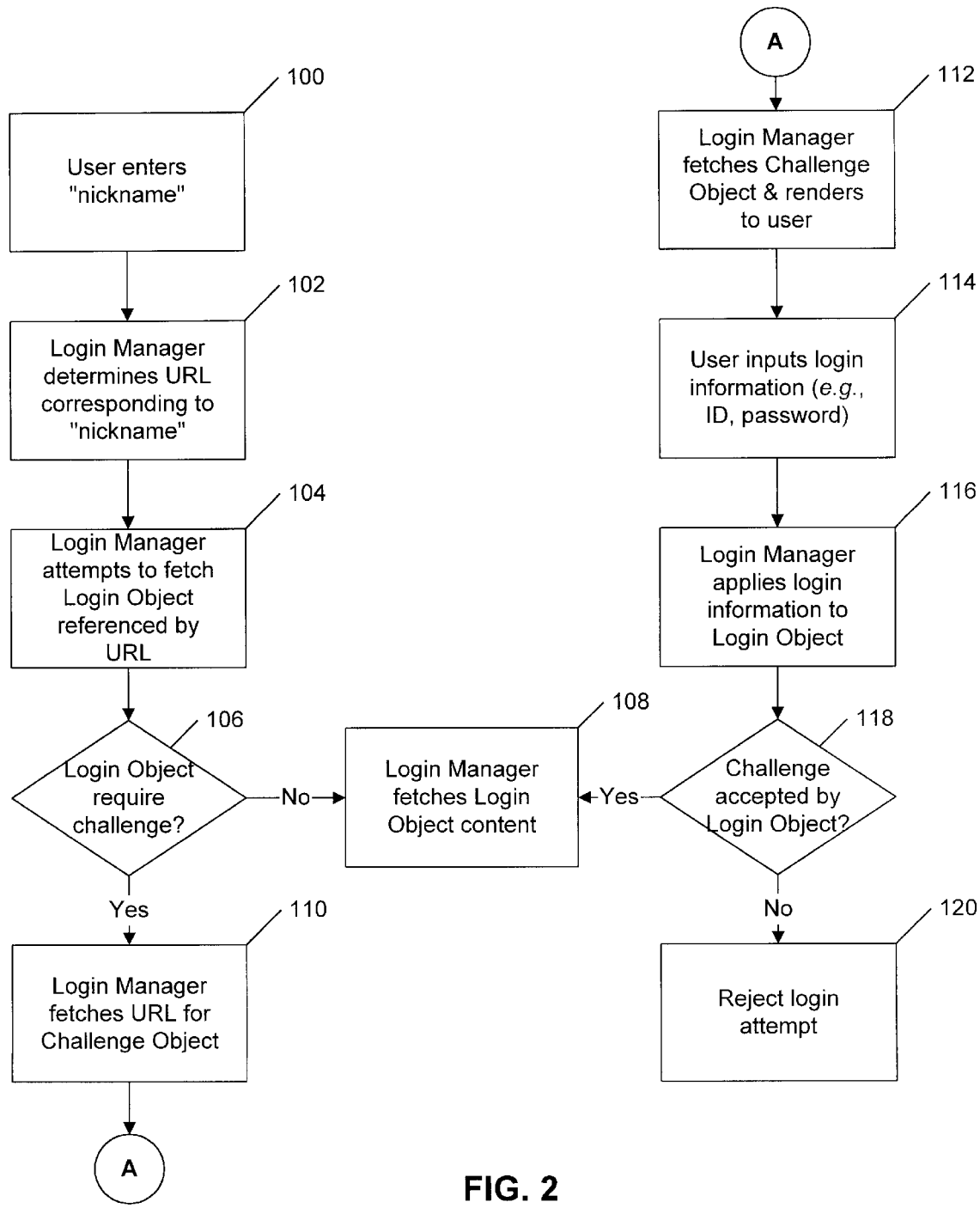
FIG. 2 is a flowchart showing one embodiment of the invention.

FIG. 1 is block diagram of object relationships in accordance with one embodiment of the invention. FIG. 2 is a flowchart showing one embodiment of the invention. The URL object model of the JAVA programming language makes challenge handling relatively straightforward. To login to an object 1, such as a desktop definition, a user accesses a Login Manager 3 running on a user system 5, which preferably is running an implementation of a JVM. The JVM provides the execution environment for the Login Manager. The user enters a nickname, such as an email address, into the Login Manager (STEP 100). The Login Manager then determines a URL that corresponds to the nickname (STEP 102). In the preferred embodiment, to avoid dependence on existing network object naming services commonly used to handle user profile confirmation, the invention employs a simple translation rule to compute a URL from an email address. The JAVA code set forth below is an example of an implementation of the preferred translation function:

```
/**
* Converts an RFC822 email address to a URL. Using the convention
* http://desktopserver+domain/~username/private/desktop/index.uil
* Where the given email address was
*       username@domain
*
* @param email an RFC822 email address entered via the greeter UI
*/
String email2URL (String email)
{
    String userHome;
    String domain = " ";
    String uilSuffix = System.getProperty("uilSuffix", ".uil");
    int tmp = email.indexOf('@');
    if (tmp != -1) (
        String user = email.substring(0, tmp);
        UserHome = "/~" + user + "/private/desktop/";
        domain = "." + email.substring (tmp + 1);
    }
    else {
        userHome = "/~" + email + "/private/desktop/";
    }
    return "http://" + Arranger.desktopServerName + domain +
            userHome + "index" + uilSuffix;
}
```

The scheme shown above was chosen because it is simple and consistent, and it negates any need for a complex and maintenance intensive network information system. In an alternative embodiment, the Login Manager can look up a "login" or target URL corresponding to the nickname, preferably using a simple lookup table. The lookup table may be located elsewhere around the network 7, such as on Server A or Server B in FIG. 1.

To access the login object 1 referenced by the URL, a new instance of a JAVA URL object is created. In the preferred embodiment, a connection to the server holding the login object 1 (Server A in this example) is made by fetching a URLConnection object from the instance of the URL class for the login object 1, and invoking its connect() method. After connecting, the Login Manager attempts to fetch the MIME (Multipurpose Internet Mail Extensions) content type of the login object 1 (STEP 104).

If the login object 1 does not require a challenge (STEP 106), the Login Manager fetches the content of the login object 1 via the getContent() method for that object (STEP 108). However, if the login object 1 does require a challenge (STEP 106), indicated by an exception generated by the login object 1, the Login Manager will invoke a getChallenge() method for the URLConnection (STEP 110). This method returns a URL to an associated challenge object 9 (shown as being on Server B in this example). The Login Manager will then fetch the challenge object 9 and instantiate it, plugging the challenge (e.g., a dialog box) into the user interface of the Login Manager (STEP 112).

The user then inputs whatever login information (e.g., username, password, encrypted key, etc.) is required by the challenge object 9 (STEP 114). The Login Manager then applies the login information to the login object 1 as an argument during an access via the connect() method for that object (STEP 116).

If the challenge is accepted by the login object 1 (STEP 118), then the Login Manager fetches the content of the login object 1 in known fashion (STEP 108). If the challenge is not accepted by the login object 1 (STEP 118), then the login attempt is rejected, typically with an error message to the user (STEP 120).

In the preferred embodiment, when implementing a URL login system in JAVA, the standard JAVA URLConnection class is overloaded with a modified implementation of the URLConnection class. Similarly, each of the standard JAVA protocol handlers are overloaded with modified implementations of such handlers. Altered versions of these standard JAVA classes can be made to serve in place of the standard versions, preferably by altering the CLASSPATH environment variable of the Login Manager's execution environment such that the Login Manager first searches for class files in a directory separate from the directory where the default implementations of the classes are stored.

The first match on the desired class name is the class used, essentially overloading the default implementation.

To provide the needed support for a URL login system, the following modifications to the classes discussed in the previous paragraph are required in the preferred embodiment:

(1) Support for a getChallenge() method, and an overloaded version of the connect() method which takes a URLChallenge as an argument, must be added to the new incarnation of the URLConnection Class.

(2) Each protocol handler must also be overloaded so that an overloaded version of the above connect() method can be added. Modification to the protocol handlers is necessary because the connect() method of the abstract object URLConnection in turn invokes the specific connect() method of the protocol handler in use.

(3) The existing protocol handlers must also be enhanced such that each is able to extract the challenge information from the instance of the URLChallenge object passed to the handler and negotiate for access to the login object with the target server controlling access to that object. Each protocol handler should assert an exception when presented with a challenge. The exception travels with the specific protocol handler to the more abstract class URLConnection and is then detected ("caught") by the Login Manager.

To accommodate all possible challenge types, the challenge objects employed by the Login Manager must all conform to a common interface so that they can be exchanged and operated on in the same fashion regardless of what type of information they contain. Accordingly, in the preferred embodiment, all challenge objects should be JAVA classes which implement the URLChallenge interface, and should always be treated as instances of the interface and never as specific classes. The code segment shown below details one implementation for processing a login attempt:

```
/**
* Called by the base login UI to access the contents of a URL
* which is guarded by a variant of URLChallenge.
*
* @param target_url the URL to log into.
* @param challenge the answered challenge, null if no challenge.
* @param frame the frame of the Login button on the UI.
*/
public void processTarget(String target_url, URLChallenge
challenge, WDFrame frame)
throws MalformedURLException,   IOException,
ChallengeFailedException
{
    URL target = new URL(target_url);
    URLConnection connection = target.openConnection ( );
    if (challenge == null) {
        try {
            // the protocol handlers should be modified to throw
            // a ChallengeRequiredException when required.
            // this will verify that the server exists and
            // is reachable
            connection.connect ( );
        } catch (Exception e) {
            if (e instanceof ChallengeRequiredException) {
                setChallenge(getChallenge(connection),
                    frame);
                return;
            }
            // the object referenced does not exist
            // so clear the greeter for another try.
            throw new IOException(e.getMessage( ));
        }
    }
    else {
        // must overload connection in each protocol handler
        // This may throw a ChallengeFailedException. If so
        // the challenge UI will reset for another try.
        // This will verify that the server exists and
        // is reachable
        connection.connect(target_url, challenge);
    }
    // the user has passed inspection so hide the greeter
    // proceed with the task of fetching and rendering the
    // content of the target URL
    doLogin(target, frame);
}
/**
* A front end loader for processTarget( ). This method computes
* the target URL to pass to processTarget as well as handling
* challenges.
*
* @param challenge the answered challenge, null if no challenge.
* @param frame the frame of the Login button on the UI.
*/
void submitTarget(URLChallenge challenge, WDFrame frame)
    throws MalformedURLException,   IOException,
    ChallengeFailedException
{
    String url = null;
    switch (current state) {
        case URL_LOGIN:
            url = gettargetURL( );
            break;
        case EMAIL_LOGIN:
            url = email2URL(gettargetEmail( ));
            break;
        case CHALLENGE:
            challenge = getChallenge( );
            url = challenge.getTarget( );
            break;
        default:
            System.out.println("Invalid desktop state");
    {}
    targetURL = url;
    // get the target from the default challenge part
    processTarget(url, challenge, frame);
}
```

Handling login and subsequent object collection via URLs through a desktop instead of a client program such as a browser allows each object to be presented to the user with a sense of context. This means that if the URL specified to the Login Manager points to an object such as an image, the request to display the image is passed through all existing sub-objects until an object is found which will handle a request of that type. The component performing the Open function then fetches the content of the URL and renders it appropriately. In the case of a login to a URL which points to a desktop, each object specified in the file referenced by the URL is fetched and rendered until the whole desktop is built up. As the content of each URL is fetched, the request is handled within the growing context of desktop objects. Since any URL can potentially present a challenge, this behavior allows logging in to URLs which point to arbitrary objects available on the network, not just URLs which resolve to a traditional desktop. Thus, one might login into a GIF file, with the result that the image is rendered on the screen like a backdrop. The same GIF file accessed from an icon within the desktop would instead display the GIF image in a separate window, which could be cascaded, tiled, resized, iconified, etc. In any case, the context of each display request determines the object handler, and the object handler renders each associated object as appropriate.

General Implementation

The invention may be implemented in hardware or software, or a combination of both. However, preferably, the invention is implemented in computer programs executing on programmable computers each comprising at least one processor, at least one data storage system (including volatile and non-volatile memory and/or storage elements, any of which may be local or accessible via a network), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system, although the programs can be implemented in assembly or machine language, if desired. In any case, the language may be a compiled or interpreted language. However, as noted above, in the preferred embodiment, the invention is implemented in the JAVA programming language for use in conjunction with any host that has a JVM.

Each such computer program is preferably stored on a storage media or device (e.g., ROM or magnetic diskette) readable by a general or special purpose programmable computer, for configuring and operating a local or remote computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for logging into restricted computer system resources using a universal resource locator ("URL"), comprising the steps of:
    (a) receiving input from a user indicating a URL referencing a login object;
    (b) applying the URL to the login object;
    (c) if the login object does not require a challenge, then permitting access by the user to contents of the login object, and otherwise:
        (1) indicating the need for a challenge;
        (2) retrieving a challenge object indicated by the login object;
        (3) rendering the challenge object to the user;
        (4) accepting login information from the user;
        (5) applying the login information to the login object;
        (6) permitting access by the user to contents of the login object in response to valid login information.

2. The method of claim 1, wherein the input from the user indicating a URL is a nickname, and further including the step of translating the nickname to a URL.

3. The method of claim 1, further including the step of rejecting access by the user to contents of the login object in response to invalid login information.

4. The method of claim 1 where the input received from a user indicating a URL referencing a login object is received in a desktop environment.

5. The system of claim 1, further including means for rejecting access by the user to contents of the login object in response to invalid login information.

6. A system for logging into restricted computer system resources using a universal resource locator ("URL"), comprising:
    (a) means for receiving input from a user indicating a URL referencing a login object;
    (b) means for applying the URL to the login object;
    (c) means for permitting access by the user to contents of the login object if the login object does not require a challenge, and otherwise for:
        (1) indicating the need for a challenge;
        (2) retrieving a challenge object indicated by the login object;
        (3) rendering the challenge object to the user;
        (4) accepting login information from the user;
        (5) applying the login information to the login object;
        (6) permitting access by the user to contents of the login object in response to valid login information.

7. The system of claim 6, wherein the input from the user indicating a URL is a nickname, and further including means for translating the nickname to a URL.

8. The system of claim 6 where the means for receiving input from a user indicating a URL referencing a login object receives the input in a desktop environment.

9. A computer program, residing on a computer-readable medium, for logging into restricted computer system resources using a universal resource locator ("URL"), the computer program comprising instructions for causing a computer to:
    (a) receive input from a user indicating a URL referencing a login object;
    (b) apply the URL to the login object;
    (c) if the login object does not require a challenge, then permit access by the user to contents of the login object, and otherwise:
        (1) indicate the need for a challenge;
        (2) retrieve a challenge object indicated by the login object;
        (3) render the challenge object to the user;
        (4) accept login information from the user;
        (5) apply the login information to the login object;
        (6) permit access by the user to contents of the login object in response to valid login information.

10. The computer program of claim 9, wherein the input from the user indicating a URL is a nickname, and wherein the computer program further comprises instructions for causing a computer to translate the nickname to a URL.

11. The computer program of claim 9, wherein the computer program further comprises instructions for causing a computer to reject access by the user to contents of the login object in response to invalid login information.

12. The computer program of claim 9 where the instructions for causing a computer to receive input from a user indicating a URL referencing a login object include instructions for receiving the input in a desktop environment.

* * * * *